(12) United States Patent
Silvola

(10) Patent No.: US 9,507,816 B2
(45) Date of Patent: Nov. 29, 2016

(54) PARTITIONED DATABASE MODEL TO INCREASE THE SCALABILITY OF AN INFORMATION SYSTEM

(75) Inventor: Brian Silvola, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 440 days.

(21) Appl. No.: 13/114,454

(22) Filed: May 24, 2011

(65) Prior Publication Data

US 2012/0303628 A1 Nov. 29, 2012

(51) Int. Cl.
*G06F 17/30* (2006.01)

(52) U.S. Cl.
CPC .................... *G06F 17/30339* (2013.01)

(58) Field of Classification Search
CPC ................................................ G06F 17/30339
See application file for complete search history.

(56) References Cited

U.S. PATENT DOCUMENTS

| | | | |
|---|---|---|---|
| 5,937,406 A * | 8/1999 | Balabine | G06F 17/30067 |
| 6,714,934 B1 * | 3/2004 | Fordham | 707/708 |
| 6,996,575 B2 * | 2/2006 | Cox et al. | 707/739 |
| 7,130,838 B2 * | 10/2006 | Barsness et al. | |
| 7,152,065 B2 * | 12/2006 | Behrens et al. | |
| 7,254,580 B1 * | 8/2007 | Gharachorloo et al. | |
| 7,319,997 B1 * | 1/2008 | Morris et al. | 707/714 |
| 7,725,470 B2 * | 5/2010 | Richards et al. | 707/737 |
| 7,792,822 B2 * | 9/2010 | Galindo-Legaria et al. | 707/715 |
| 7,831,590 B2 * | 11/2010 | Gangarapu et al. | 707/715 |
| 8,209,306 B2 * | 6/2012 | Greer | 707/698 |
| 2004/0107204 A1 * | 6/2004 | Sakamoto | 707/101 |
| 2006/0041560 A1 * | 2/2006 | Forman | G06F 17/30864 |
| 2008/0126335 A1 * | 5/2008 | Gandhi et al. | 707/5 |
| 2008/0306911 A1 * | 12/2008 | Loofbourrow | G06F 17/30622 |
| 2009/0260016 A1 * | 10/2009 | Ramakrishnan et al. | 718/105 |
| 2010/0318519 A1 * | 12/2010 | Hadjieleftheriou et al. | 707/742 |
| 2011/0213775 A1 * | 9/2011 | Franke et al. | 707/737 |
| 2012/0296913 A1 * | 11/2012 | Ash et al. | 707/741 |

* cited by examiner

*Primary Examiner* — Amresh Singh
(74) *Attorney, Agent, or Firm* — Nixon & Vanderhye P.C.

(57) ABSTRACT

A database includes data tables and indexes that are partitioned. Searches against the data table are performed in parallel over the multiple partitions. The indexes on each partition maintain indexes associated with the data on the given partition. Data tables storing string data include a string data file and index files for each word stored in the string data file.

19 Claims, 9 Drawing Sheets

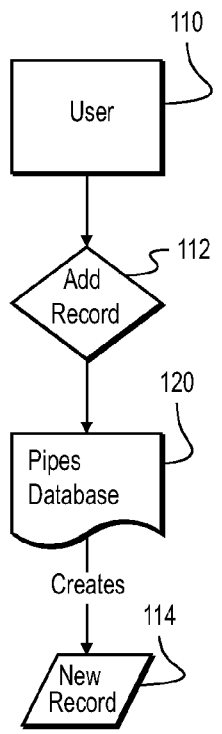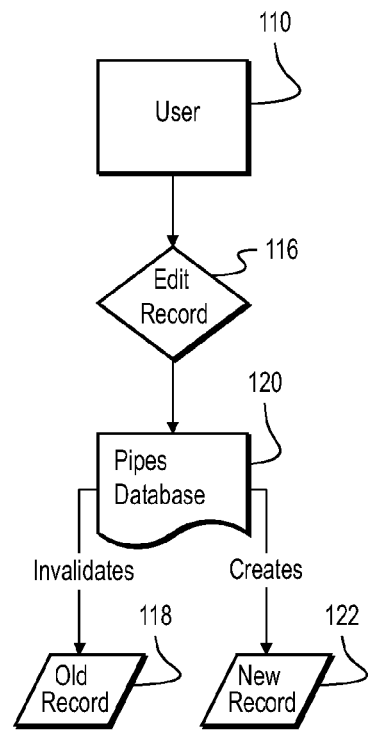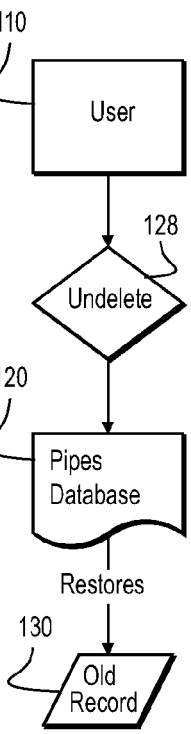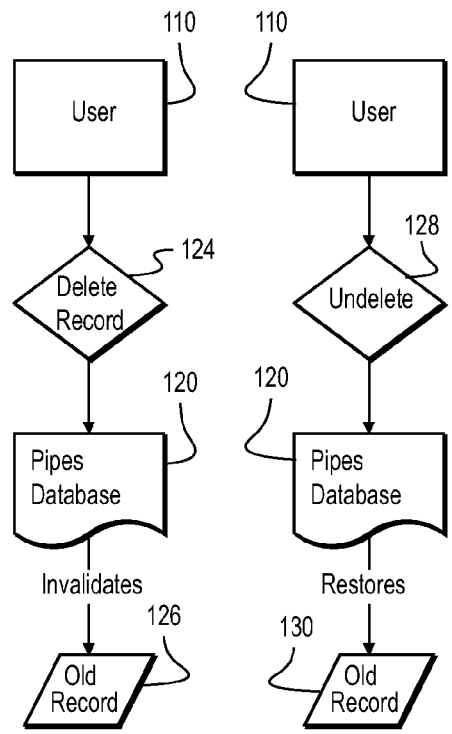
FIG. 2A  FIG. 2B  FIG. 2C  FIG. 2D
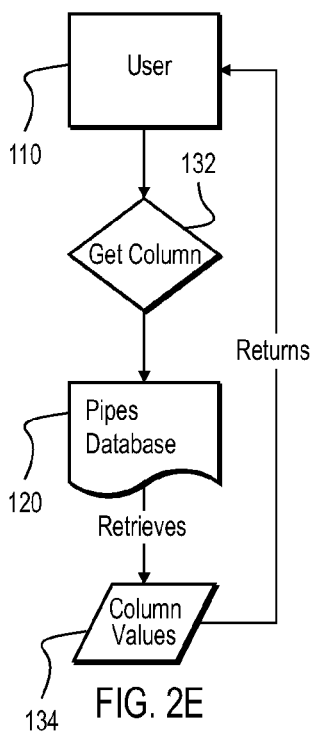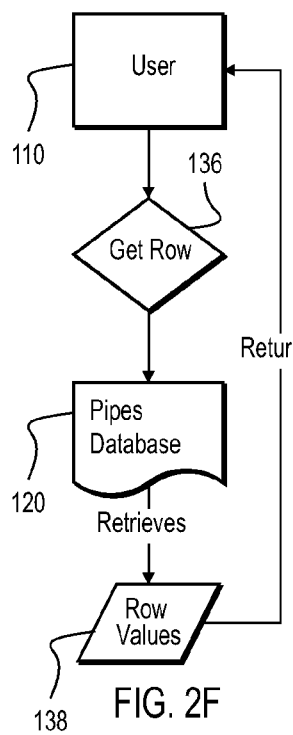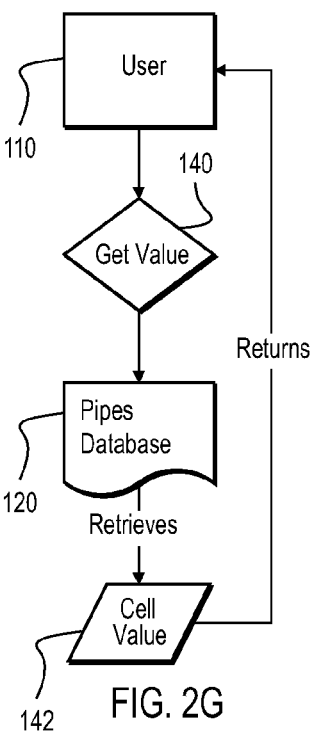
FIG. 2E  FIG. 2F  FIG. 2G

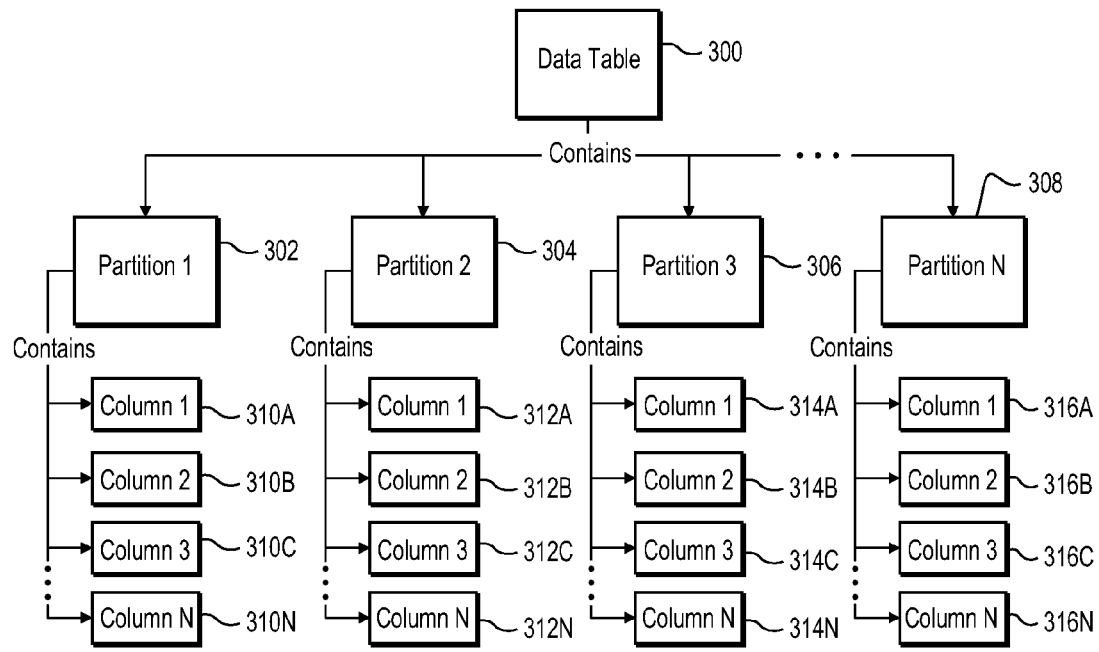
FIG. 3
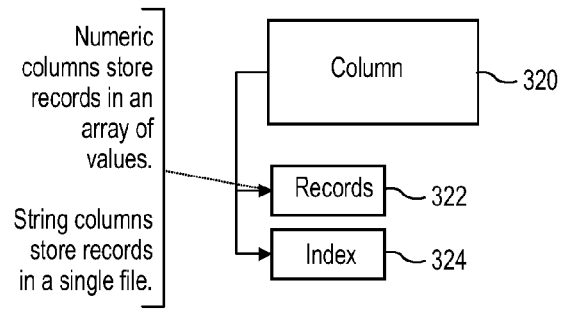
FIG. 4A
FIG. 4B

| Sample.bin | |
|---|---|
| Record Number | Position |
| 0 | 0 |
| 2 | 0 |
| 5 | 0 |
| 6 | 0, 3 |
| 7 | 1, 2 |

FIG. 5B

| Different.bin | |
|---|---|
| Record Number | Position |
| 1 | 0 |

FIG. 5C

| Text.bin | |
|---|---|
| Record Number | Position |
| 0 | 1 |
| 2 | 1 |
| 5 | 1 |
| 6 | 2 |

FIG. 5D

| Data.bin | |
|---|---|
| Record Number | Position |
| 1 | 1 |
| 3 | 0 |
| 4 | 0 |
| 6 | 1 |
| 7 | 0, 3 |

FIG. 5E

PARTITIONED DATABASE MODEL TO INCREASE THE SCALABILITY OF AN INFORMATION SYSTEM

CROSS-REFERENCES TO RELATED APPLICATIONS

Statement Regarding Federally Sponsored Research or Development

Field

The technology herein relates to databases and more specifically to partitioning database elements such as tables and indexes. The technology herein also relates to the parallel execution of searches in a database that includes partitioning. The technology herein further relates to improved memory management techniques for databases with partitioned elements.

BACKGROUND AND SUMMARY

Digital information is everywhere. TV shows, computer programs, books, text documents, patent applications, statistics, and many more types of information exist in digital forms. Furthermore, more and more digital data is created each day. Accordingly, systems and methods of both storing and providing access to digital data are desirable.

One common technique for storing and/or accessing digital data is through a database. Databases are organized collections of data. The organization of data stored in databases typically allows for faster access than data located in an ordinary "flat" file (or other "unorganized" techniques).

In an unorganized data scenario, a search for a given piece of information may be linearly related to the amount of data that is to be searched. For example, information on the last names of employees in a company may be stored in an unorganized manner. A search for a given last name will typically be linearly related to the number of last names that need to be searched over. In contrast, data stored with a database may be pre-sorted allowing for faster access. One technique accomplishes this using an index.

Indexes typically use a key where the stored keys are pre-sorted to allow for faster retrieval of the keys. Thus, in the above example, an index created against the last names may cause the last names to be pre-sorted in an alpha-numeric manner. Thus, a search for a given name (e.g., "Jones") may be carried more efficiently because the location of "Jones" relative to the other names may be more quickly determined. For example, "Jones" will not appear after the name "Rich" in the index. As such, the records after "Rich" are not considered during the search and the cost of looking for "Jones" is reduced. This generally leads to a search efficiency that is better than the linear search efficiency of unorganized data.

One downside of indexes is that they are typically updated every time a new piece of data related to the index is inserted. An update of an index may require a re-sorting of the index. This can be an expensive process. Further, as the quantity of data being indexed increases the cost of maintaining the index may become more and more expensive in terms of both storage and computational costs.

While the cost of searching in databases increases less than unorganized collections of data, it still may increase. As noted above, the amount of data being created and stored is growing rapidly. Further, it is often desired to maintain digital data that has already been created (e.g., "old" data). This combination of requirements can lead to rapidly increasing quantities of data being stored in a database (and presumably accessible in some manner).

The growth of stored data is typically faster than increases in computing power. For example, performance of a database may be increased by storing more data in RAM instead of non-volatile storage (e.g., a hard-drive) to allow for faster response and access times. However, continually storing all data in RAM may become prohibitively expensive as RAM is traditionally more expensive and able to hold less information than other types of non-volatile storage. Additionally, the performance of databases may be improved by upgrading, for example, the computer processor that is used to a newer, faster model. However, these solutions can be outstripped by the ever increasing amounts of stored data.

The performance problems (e.g., index rebuilds and/or access times) associated with storing data may be relevant to very large systems holding vast amounts of data (e.g., the Library of Congress) to smaller systems holding more personalized data (e.g., a contact list or list of emails on a smart phone).

Accordingly, it would be desirable to develop systems and/or methods that improve the performance, efficiency, and the like of database systems.

In certain example embodiments, a partitioned index is provided. The partitioned index for use with a database provides (or recreates) the functionality of a traditional data table (in some case all of the functionality), while at the same time encompassing (or integrating) indexing and search methods.

Certain example embodiments may be adapted to partition data tables into equally sized smaller units, each having capabilities and functionality generally associated with a data table.

Certain example embodiments may be adapted to facilitate constant-time performance for index operations on new records added to, edited in or deleted from a data table over the entire lifecycle of the system.

Certain example embodiments may be adapted to facilitate increased search performance over traditional database models by allowing parallel concurrent execution of search methods across multiple partitions.

Certain example embodiments may be adapted to manage memory dynamically and efficiently by using a cache system that stores the most recently used (or most likely to be used) text data in a restricted-memory structure that avoids runaway memory usage, yet may still provide good performance.

Certain example embodiments may be adapted to enhance system resource flexibility by making partitions hardware-independent. In other words, different hardware units may host different partitions of the same data table.

Certain example embodiments may be adapted to allow users a flexible system memory usage model with customization options for the allocated memory per partition and the number of partitions simultaneously loaded into system memory.

Furthermore, in certain example embodiments a memory management technique may include a failsafe mechanism that dynamically decreases the memory footprint of each partition when system memory is nearly exhausted. Further, this memory management technique may be implemented with the partitioning techniques according to certain example embodiments.

In certain example embodiments, a computer implemented method for managing a database that is configured for use with a processing system is provided. A structured organization of data is maintained over a plurality of partitions within the database where each one of the plurality of partitions has a size limit. New data is inserted into the structured organization of data. A new partition is automatically added when the inserted new data results in a size of the one of the plurality of partitions meeting or exceeding the respective size limit. The data within each one of the plurality of partitions is indexed.

In certain example embodiments, a database-management system for managing a database is provided. The system includes a processing system that is configured to maintain a structured organization of data over a plurality of partitions within the database where each one of the plurality of partitions has a size limit. The processing system is further configured to insert new data into the structured organization of data. A new partition is automatically added when the inserted new data results in a size of the one of the plurality of partitions meeting or exceeding the respective size limit. The processing system is configured to maintain an index on each of the partitions for the data located on the associated partition.

In certain example embodiments, a non-transitory computer readable storage medium is provided for performing a string search against a database system storing string data over a plurality of partitions. Each one of the partitions includes: 1) a string file configured to include plurality of strings, and a table pointing to each one of the strings within the respective string file, 2) a plurality of index files, each one of the plurality of index files associated with a word or words within the string file. In certain example embodiments, each one of the plurality of index files stores a reference to instances of the associated word within the partition. The stored instructions are configured to execute a search, in parallel over the multiple partitions, that is associated at least one word that is within the string file. The stored instructions are configured to locate at least one of the plurality of index files related to the at least one word and identify at least one record index and at least one position index within the at least one of the plurality of index files. The reference information may be read and based on the reference information (e.g., the position and record index) the string/word that is being searched for may be retrieved from the correct string file in certain example embodiments.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 2A-2G show flowcharts of exemplary illustrative non-limiting database operations;

FIG. 3 shows an exemplary index in a database;

FIG. 4A shows an exemplary data table and multiple partitions of an example database according to certain example embodiments;

FIG. 4B shows an exemplary layout of data according to certain example embodiments;

FIGS. 5B-5E are example indexes according to certain example embodiments;

DETAILED DESCRIPTION

A database according to certain example embodiments may be implemented in an exemplary library that a user may use to interface with the functionality of an illustrative database. One exemplary non-limiting embodiment described herein is a PipesDB library created by the inventor of the instant application.

Certain example embodiments may alternatively, or in addition to, relate to a database management system (DBMS) used for interfacing with an exemplary database. As is known, such systems provide access and functionality to the data being stored in the database (e.g., inserting data, retrieving data, etc).

As used herein, when a database performs an operation (e.g., selection and/or insertion) an associated library or DBMS may perform such on operation on the database.

One technique of organizing data in databases is to use data tables to hold the data contained within the database. Certain example embodiments described herein may implement functionality that is traditionally associated with a data table of a database. This may include the following features and operations:

Definition of the structure of a data table in terms of the names and types of data that may be stored in its columns.

Add new records.

Edit existing records.

Delete existing records.

Note: Deleted records may be marked as DELETED, but may never be physically deleted.

Undelete records that have been deleted.

Note: Changes DELETED status of a record to CURRENT.

Get a value stored at a row-column intersection.

Get an entire row.

Get an entire column.

Get a column's values for a given set of row numbers.

Get a set of rows for a given set of row numbers.

Figure 1A:
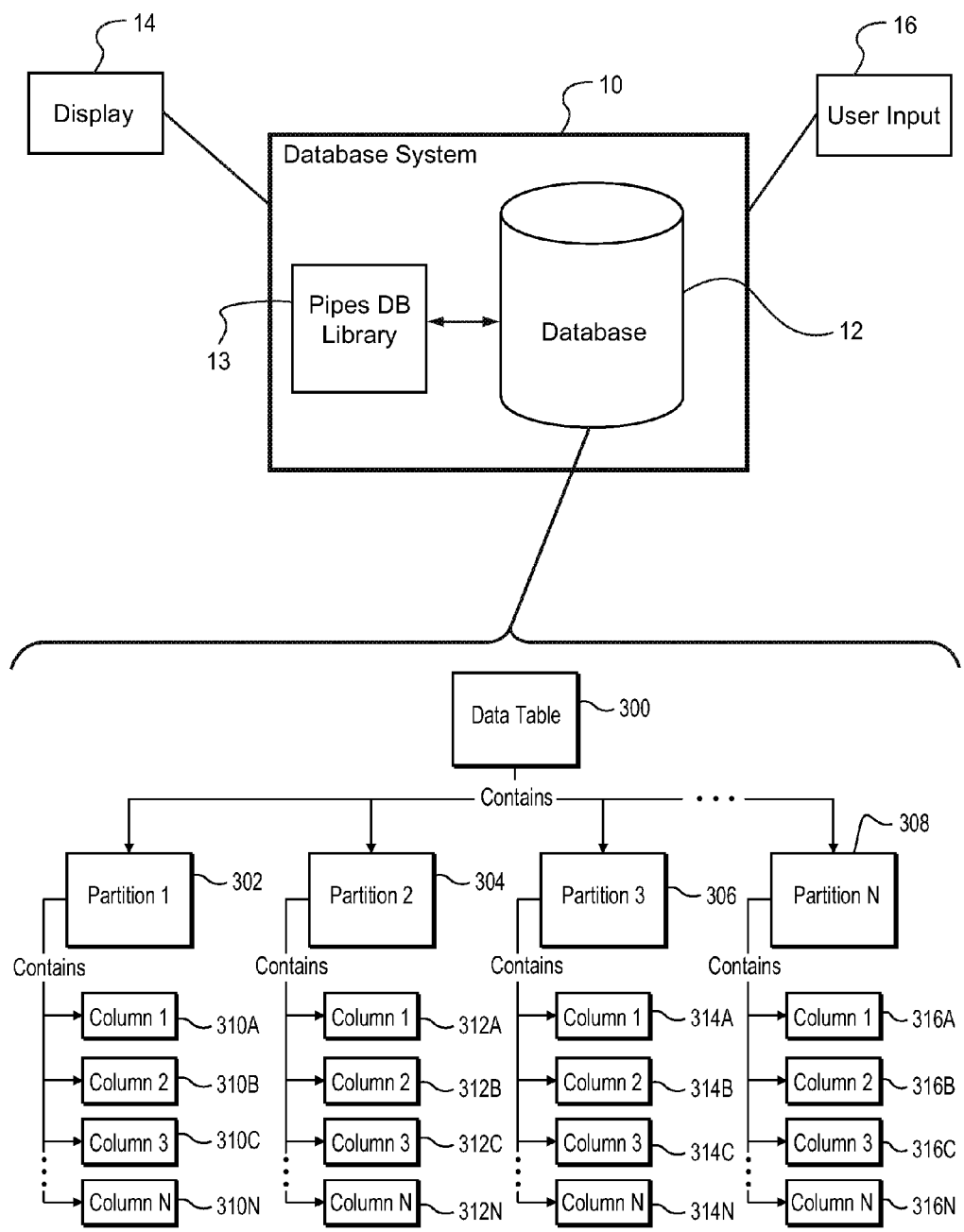
FIGS. 1A and 1B show an example system configuration for a database.
Figure 1B:
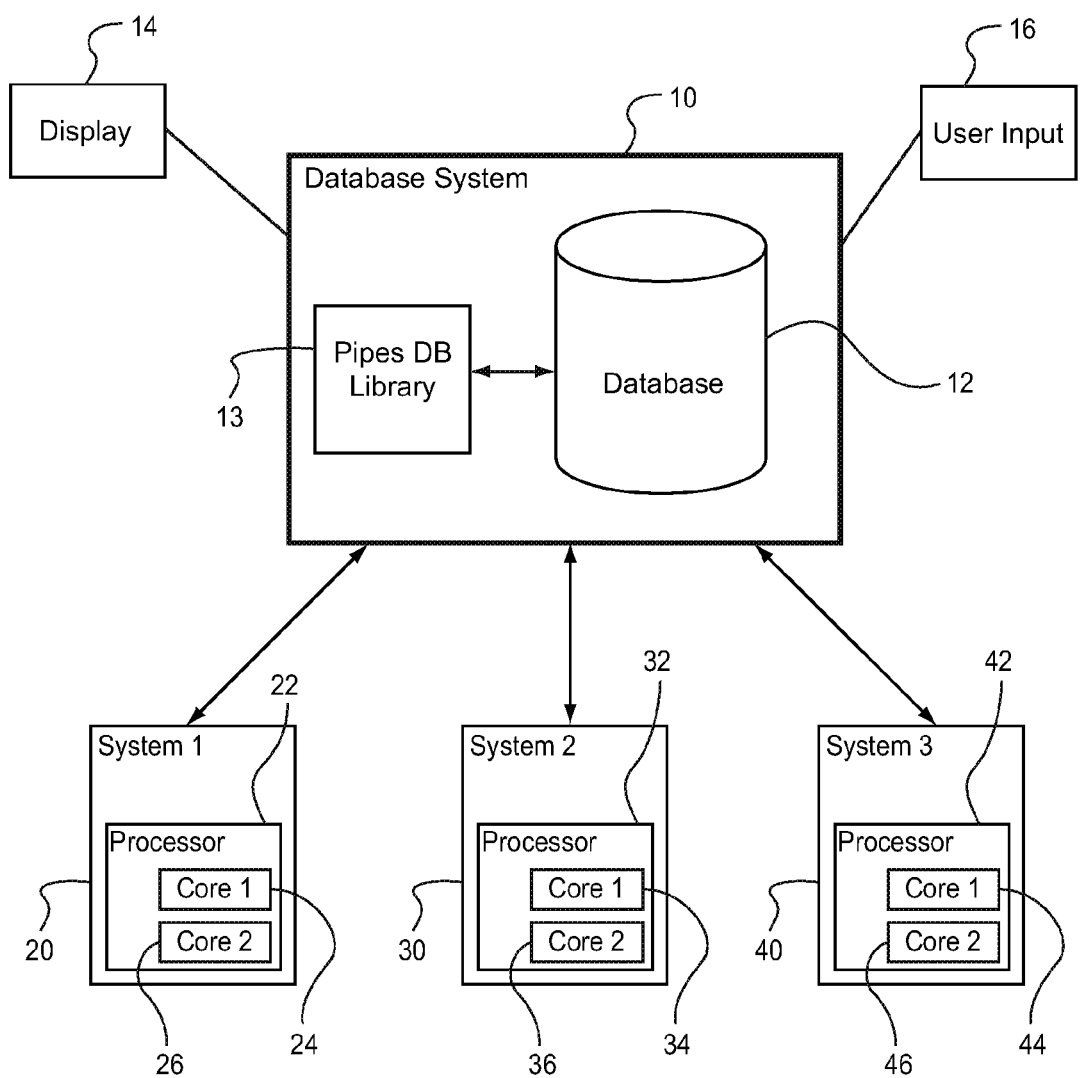

Referring more particularly to the drawings, FIGS. 1A and 1B show an example system configuration for a database according to certain example embodiments. A database system 10 includes an exemplary library, PipesDB, 13 and an associated database 12 containing data. A user may interface through user input 16. User input 16 may include, for example, a mouse, keyboard, touch screen, network connection, or other types of interfaces that facilitate input of user commands to the database management system 10. A display 14 may also be included to present a graphical user interface or the like to a user that is interacting with the database system 10 and the associated library 13 and database 12.

The database system 10 may communicate with systems 20, 30, and 40. Each system may include a respective processor (22, 32, and 42) and each processor may include multiple cores (24, 26, 34, 36, 44, and 46). As will be explained in greater detail below, multiple systems, processors, and/or cores may facilitate increased performance of certain aspects of the database 12. For example, a data table 300 included in database 12 may be partitioned among the systems, processors, and/or cores. For example, the data table 300 may be partitioned into N different partitions, with each partition (302, 304, 306, and 308) being operated on by a core (e.g., 24, 26, 34, 36, 44, and 46) of the multiple systems (20, 30, and 40). For example, cores 24 and 26 may process, store, etc partitions 302 and 304 respectively. Core 34 may similarly operate on partition 306. Partitions up to partition N 308 may be operated on by the remaining cores 36, 44, and 46. It will be appreciated that other embodiments may be implemented to divide and assign different partitions to different computing resources (e.g., 2 partitions per core).

Index and Search Features

Certain example embodiments may include various techniques for accessing and manipulating data within a database. FIGS. 2A-2G illustrate exemplary database operations. These operations may be triggered or directed by a user 110. In other example embodiments, the trigger may be an automated process (e.g., from a triggered monthly report, such as total sales for that month). Accordingly, different operations may be implemented against a database. In FIGS. 2A-2G the database "Pipes Database" is implemented.

In FIG. 2A, an exemplary insertion operation is shown. User 110 provides an "add record" instruction 112 and data to be inserted. The instruction may then cause the database (or associated database management system) to cause the insertion of the data into the database. This process may include inserting the data into one or more tables within the database. This may in turn cause the creation of new record 114 in a data table of the database 120.

In FIG. 2B an exemplary edit or update operation is shown. The user 110 provides an edit record 116 operation and associated data communicates with the database 120. The database invalidates the old record 118, and creates a new record 122 with the updated data provided by the user. It will be appreciated that creating a new record and invalidating the old record may allow for a database to roll back the edit even after the edit operation is complete. However, in certain example embodiments, the existing record may be updated rather than invalidated. In such embodiments, a new record may not be created.

In FIG. 2C an exemplary delete operation is shown. In this example user 110 provides a delete operation 124 and specifies the record to be deleted. Then the database 120 invalidates the old record 126. This may be done by setting a property of the record being deleted to "invalid" or "deleted." In certain example embodiments, the deleted or invalid status of a record may be controlled by a bit field associated with the record. Accordingly, the bit field may be set to "1" for true, indicating the record has a status of invalid or deleted. In certain example embodiments, only marking the record as invalid (e.g., not removing it from memory/storage) may facilitate the rollback of the delete operation at a later date (e.g., in case of a mistake). In certain example embodiments, the record may be permanently removed from storage as opposed to invalidated.

In FIG. 2D an exemplary restoration operation is shown. The user 110 provides an undelete operation 128 to database 120. This, in turn, restores old record 130, which had previously been invalidated.

In FIGS. 2E, 2F, and 2G shows exemplary retrieval operations. The user 110 provides the specified retrieval operation (get column 132, get row 136, or get value 140). The specified operation interacts with the database 120 to retrieve the requested data (column values 134, row values 138, or cell value 142). The retrieved data is then returned (e.g., presented) to the user 110.

Index and Search Features

In certain example embodiments, index data is stored in a database (e.g., the pipes database 120). Indexing of data may be done so that data may be queried and retrieved quickly at a later point in time. In certain example embodiments, all of the data in a database may be indexed. Indeed, such indexing may apply to both string (e.g., text) data and numerical data. In certain example embodiments, the qualitative differences between numeric data and string data, may lead to different indexing and search methods for each type of data. Alternatively, the method may be the same or similar for indexing and search functionality. In certain example embodiments, indexing of data may occur automatically for all columns of a data table.

In certain example embodiments, columns each maintain their own index. This index may sort data in such a way that a query can be resolved in a very small number of operations. For example, columns that store numeric data, such as FIG. 3, may be specified as follows: 1) Index table 206 may store an index related to the scores column 216 of table 208; 2) Key column 210 is the key of index table 206. The value column 212 of index table 206 stores the key value 214 of table 208; 3) The order of the records in the index table 206 is derived from the ascending order of the score column 216. In other words, the first record (0, 4) in the index table 206 references the smallest numerical number from the score column 216 of the data table 208. The successive records of index table 206 correspond to the ascending order of the score column 216 (e.g., key 0 of the first record in index table 206 corresponds to the smallest value "1" at the fifth record in data table 208, and key 5 of the sixth record in index table 206 corresponds to the largest value "400" at key 3 in data table 208. String columns are described in more detail below.

Certain example embodiments may use search methods based on a custom query language that is similar to structured query language (SQL). Certain example embodiments may include functionality that allows users to specify relational operators, conditional operators, columns, values that describe their request, etc. . . .

In certain example embodiments, a search method parses a received string to determine the desired query operations, in what order they occur, and how results are to be combined to meet the user's criteria.

The performance of search and index operations may behave in $\Theta(\log_2 n)$ time where n is the number of records in a given partition. Since this performance is bound by the size of a partition, and since partition size may be constant over the lifecycle of the system, index performance can be considered to be $\Theta(1)$ for all practical purposes.

In certain example embodiments, search operations may be performed over multiple partitions. Accordingly, the overall complexity of a search operation may be expressed as $\Theta(p*\log_2 n)$ where p is the number of partitions of a given data table, and n is the number of records located on an individual partition.

Partitioned Data Concept

As mentioned above, certain example embodiments may partition data tables of a database. To achieve near constant-time algorithmic complexity and performance, while ensuring a flexible memory model, the data table in a database may be comprised of independent partitions, with each partition being bound by a maximum number of rows (e.g., a size).

FIG. 4A shows an exemplary data table that is implemented over multiple partitions of an example database according to certain example embodiments. FIG. 4B shows an exemplary layout of data according to certain example embodiments.

In certain example embodiments, a partitioned data table includes the following principles and/or provides the following benefits to performance and scalability:

1) When a partition is filled with records (e.g., over a predetermined or dynamically determined size), a new partition is automatically created. Thereafter, new records may be indexed into the new partition as if it were a completely new data table.

Figure 4C:
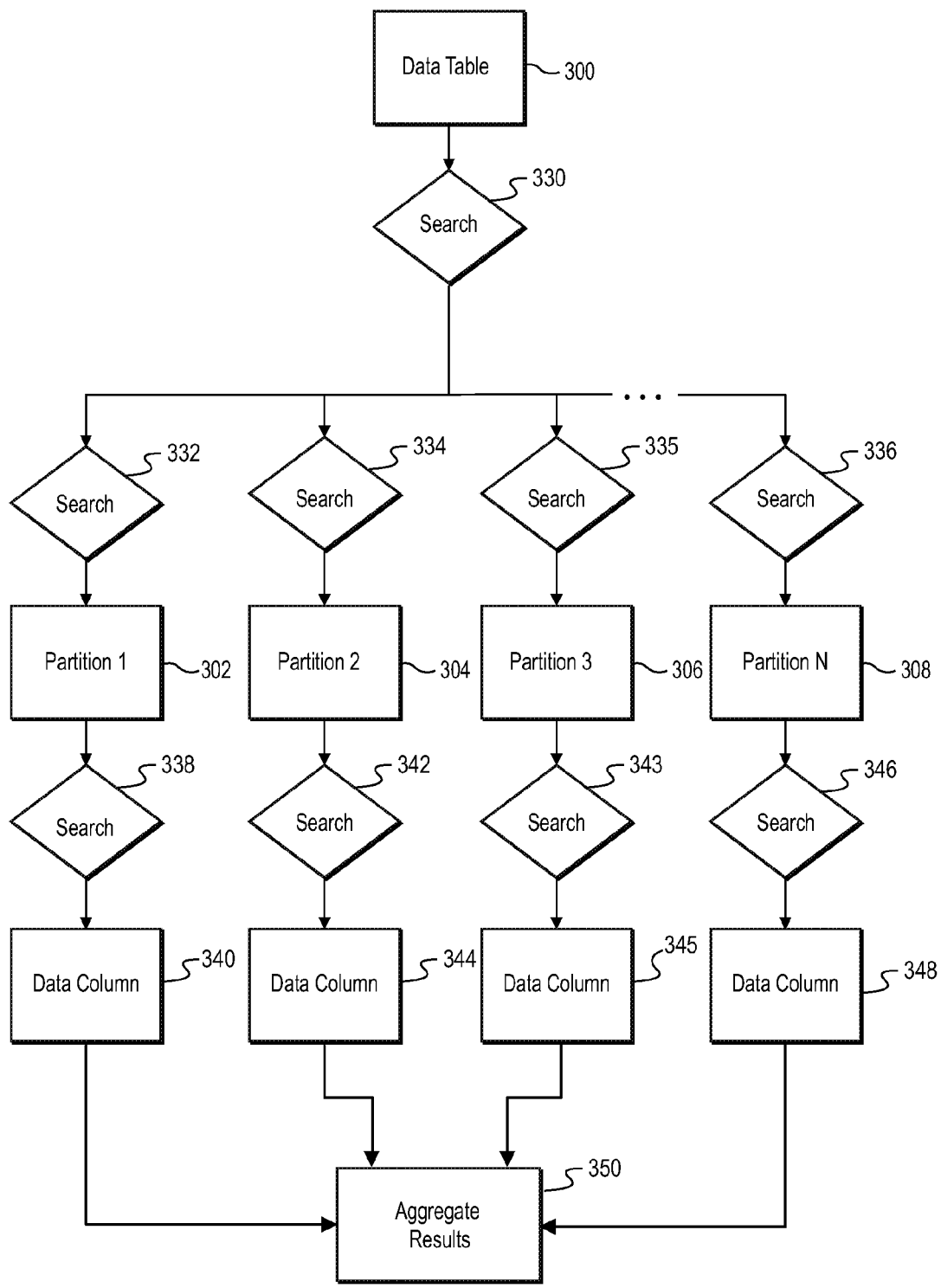
FIG. 4C is a flowchart of example search.

2) When a search operation is performed against a data table, the search may be performed over each of the partitions associated with that data table. FIG. 4C is a flowchart of example search where a parallel search is implemented according to certain example embodiments. The combined results of the independent searches may be returned to the user. Since all partitions may function independently of one another, each search operation can be performed in parallel to the other search operations. Accordingly, traditional concurrency checking that may be associated with other types of parallel processing may be avoided. Accordingly, certain example embodiments may allow for parallelism (even on an extreme scale) that will provide immediate, tangible, and linear performance gains with the addition of more partitions and associated processing systems (e.g., processors, cores, threads of execution, etc). It will be appreciated that with multi-core parallel processing being a major focus of performance computing in the present and future, it may be very likely that future hardware technologies will focus on processing data with more than one core of execution. Thus, in certain example embodiments, the partitioned search implemented as an exemplary PipesDB may be immediately ready to take advantage of such hardware advancements.

3) In traditional databases, as more records are added to a data table, more operations are required to perform an index operation. (e.g., because the index must be rebuilt for each inserted piece of data and the rebuild time is associated with the total number of records being indexed). As a result, the amount of time taken to index a record may grow exponentially in comparison to the size of the data table. In certain example embodiments, by managing the data table with a fixed-size partition, the number of operations required to perform an index operation for a new record may be constrained by the maximum record limit established for the partition. Accordingly, this maximum record limit may facilitate a performance benchmark that can be relied upon over the lifecycle of the system. Furthermore as more partitions are added (and the overall size of a data table increase) the cost of indexing a given record may be bound.

4) Because of the stable performance characteristics of the partition model, certain example embodiments may ensure that the following performance characteristics are true for the entire lifecycle of the system: A) Record Index Time is performed in $\Theta(\log_2 n)$ time where n is the number of records in a single Partition; and B) Record Search over the entire database is performed in $\Theta(p*\log_2 n)$ time where p is the number of partitions, and n is the number of records in a single partition.

5) In certain example embodiments, if a system becomes very large, performance can be improved easily, immediately, and/or cheaply using the following techniques: A) increase system memory to increase the amount of data that can be cached at any point in time; and B) add processor cores, and/or perform operations on a massively parallel processor such as a dedicated graphics processor with many stream cores, or an FPGA (Field Programmable Gate Array);

In certain example embodiments, the results of the techniques described herein may be that: A) all search operations may be performed concurrently across multiple partitions; B) the time taken to perform a search may be a linear function of the number of cores available. For example, performance with multiple cores can be evaluated as $\Theta((p*\log_2 n)/c)$ where p is the number of partitions, n is the number of records per partition, and c is then number of cores; and C) by utilizing multiple cores of execution, $\Theta(\log_2 n)$ time can be achieved by matching the number of partitions with the number of cores of execution.

6) In addition to the above-mentioned benefits to partitioning data, certain example implementations allow for hardware abstraction to occur. This may be desirable in the case of truly massive systems. For example, if a table's data exceeds the memory or hard disk limitations of a reasonable system, different partitions of the same data table may be stored on several different physical machines without affecting the integrity of the data table. Further, with this level of abstraction, it is possible to freely create a system without consideration for the eventual level of system traffic. As the traffic or usage grows, this type of system would provide a very long period of overall forgiveness until it would be necessary to upgrade hardware. Even then, it is possible to upgrade hardware very slowly to match the needs of the system as it grows. Thus, this type of system may be suited for a project or group with unspecified resources, or for enterprises with low physical resource budget, and high data transaction volume.

FIG. 4A shows an exemplary data table and multiple partitions of an example database according to certain example embodiments. The data table 300 may be partitioned into partition 1 302, partition 2 304, partition 3 306, and any number of further partitions up to partition N 308. Each partition may contain any number of columns up to N columns. For example, partition 1 302 may contain columns 310(A, B, C, N), partition 2 304 may contain columns 312(A, B, C, N), partition 3 306 may contain columns 314(A, B, C, N) and partition N 308 may contain columns 316(A, B, C, N).

FIG. 4B shows an exemplary layout of data according to certain example embodiments. The column 320 has stored therein records 322 each associated with an index value within index 324. Numeric columns store records in an array of values, while string columns store records in a single file.

FIG. 4C is a flowchart of an example search that illustrates a parallel search flow of partitions 302, 304, 306, and 308 within data table 300. When a search 330 is requested, searches 332, 334, 335, and 336 are allocated, one for each of the partitions 302, 304, 306, and 308. Each search 332, 334, 335, and 336 is performed parallel and independent of the other searches (e.g., without need for concurrency checking).

Searches 338, 342, 343, and 346 may be performed on data columns 340, 344, 345, and 348 respectively. Aggregate results 350 of the searches are combined and returned/presented to the user.

String Storage

Unlike typical integral types of data, string data may be of an unpredictable size. For example, in certain instances an integer can be relied upon to be 4 bytes long. However, a string may be of any size, for example, the Novel of "War and Peace" by Leo Tolstoy vs. the word "Foo( )" To address this unknown quantity, some systems give string storage a maximum predetermined size.

The above techniques may waste memory/disk space in some cases. This is because very few strings would actually use the maximum size. Furthermore, this type of implementation restricts the size of the string in such a way that some strings that may need to be saved will not fit in the allotted space. This can lead to a negative user experience with a software application that stores data. For example, when a user expects to save the full text of "War and Peace" only the first chapter is stored.

Figure 5A:
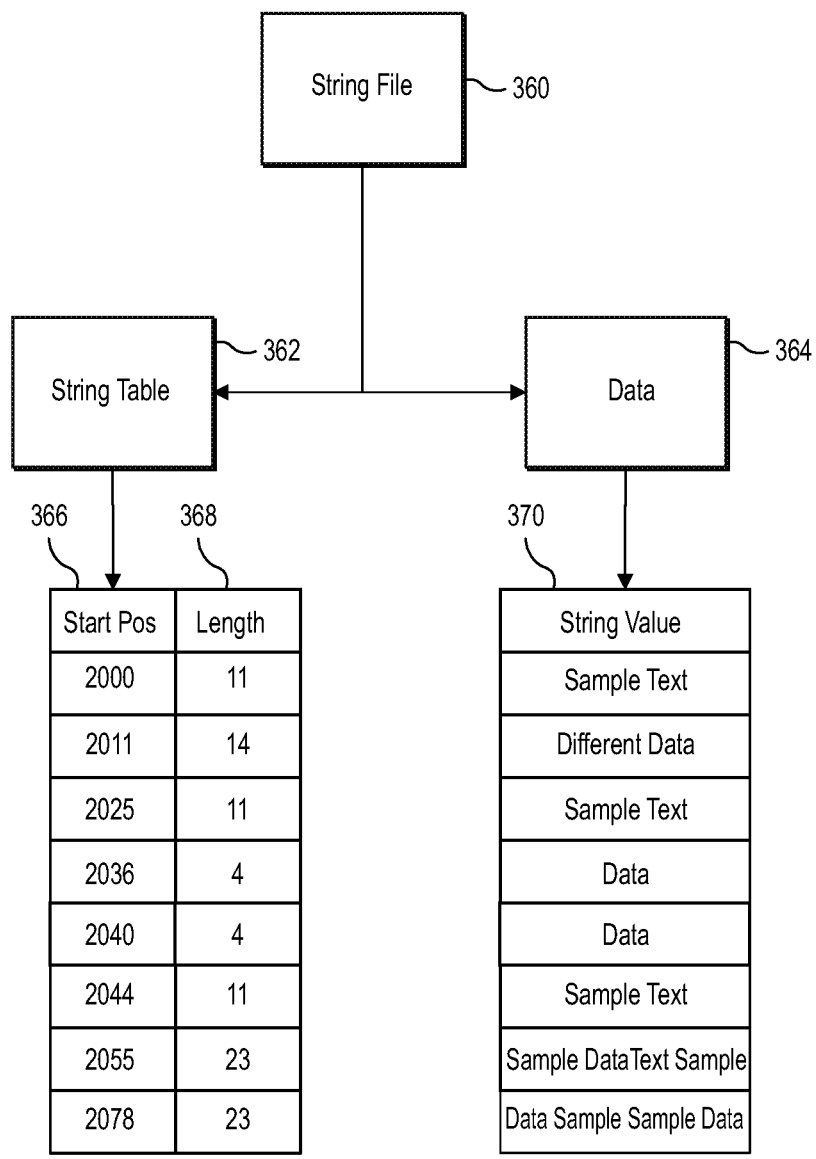
FIG. 5A is an example string file structure according to certain example embodiments.

Certain example embodiments use a string storage method that saves all strings for one column into one file. FIG. 5A shows an example string file structure according to certain example embodiments. In certain example embodiments, the size of a partition may be known when the partition is created. Thus, it may be possible to create a table in each column's string file that keeps track of where in the file each string is stored. In such an implementation, the first portion of the file may contains integer pairs that define the position in the file where a record's string is stored, and the length of the string stored for a record. In lookup operations, the file can be opened, offset to a position value that matches the place in the table for a particular row number. The two integers found at this place in the table may define the position in the file where the record's string can be found, and the length of the string in file for the record.

Using this type of structure, it is reasonable to keep a file stream open persistently for a string file that is expected to be used frequently. As a result, repeated accesses to this open file stream are much faster than accesses to a closed stream. By storing all of the strings for a column in one file, it makes it reasonable and possible to keep the entire column's string data in one file without causing undue lookup times or search operations for the appropriate string.

FIG. 5A illustrates a string file 360 and the structure therein. The string file 360 includes a string table or tables 362 and data 364 (e.g., string data). A start position 366 and length 368 of each string value is stored in the string table 362. In certain example embodiments, the string table is stored at the beginning of the file. The data 364 includes string values 370. For example, "Different Data" is located at start position 2011 and has a length of 14 characters. Thus, in certain example embodiments, a given string may be retrieved by the combination of its location (e.g., start position 366) and the number of characters to be read (e.g., length 368). Similarly, when a record (e.g., a string) is added, the index for that string is saved to the string table and then the string may be then added to the string file by appending it to the string data in the file.

String Index

Although integral values can be stored in a sorted array, it may not reasonable to store string values in such a way. Due to the nature of how users search for information, it is often more valuable to recognize the ways words are combined in phrases than whether or not the value of one word is greater than another. Accordingly, methods used to index integral values may not useful for indexing strings. However, if such functionality is desired by a user, then the integral indexing method may be used.

In certain example embodiments, string columns use an indexing method that keeps track of each individual word that is used in records from that column. The functionality may be described as such: 1) an index file is created for each word that exists in one or more records (in certain example embodiments, the file name is the word itself, stored with the file extension .BIN); 2) each index file contains the record number(s) from the data table for records in which the word is used; and 3) each record number stored in the index file is followed by a list of numbers that indicate the positions in the record's text where the word appears. In certain example, embodiments the position is related to the position of the given word within the text of the string.

String Search

Conventionally, a search operation for a string in normal conditions can be a very intensive operation that requires significant analysis of a very large amount of text in a significantly large system.

In certain example embodiments, a word can be searched by examining the file that is named after the word. For example, in the search for a single word, such as "SAMPLE", the system would find the file "SAMPLE.bin." This system could read all record numbers from this file as results for the search operation.

In another example, a user may search for a complex condition such as multiple words "SAMPLE WORDS". In this case, the system would open the file "SAMPLE.bin," retrieve the records that contain the words, and the positions where the word occurs. Then, the system opens the "WORDS.bin" file, and compares the positions where "WORDS" occurs to where "SAMPLE" occurs. In cases where there is a record number match, and the positions values for sample and words are adjacent, a match is found.

Example

SAMPLE.Bin Contents

| Record Number | Positions |
|---|---|
| 0 | 3, 7, 15 |
| 1 | 9 |
| 4 | 1, 42 |

WORDS.Bin Contents

| Record Number | Positions |
|---|---|
| 0 | 10, 17 |
| 3 | 1, 5, 25 |
| 4 | 43 |

In the example above, based upon the information in the Index, it can be determined that both records 0 and 4 contain the words "SAMPLE" and "WORDS." However, only record 4 contains the phrase "SAMPLE WORDS." Record 0 is not a match for this phrase because when the positions for record 0 are compared in both indexes, no two positions are consecutive. For record 4, the SAMPLE index contains position 42, and the words index contains position 43. Based upon this information, the adjacency of the two words can be verified.

FIGS. 5B-5E show example indexes corresponding to the data shown in FIG. 5A.

Figure 5F:
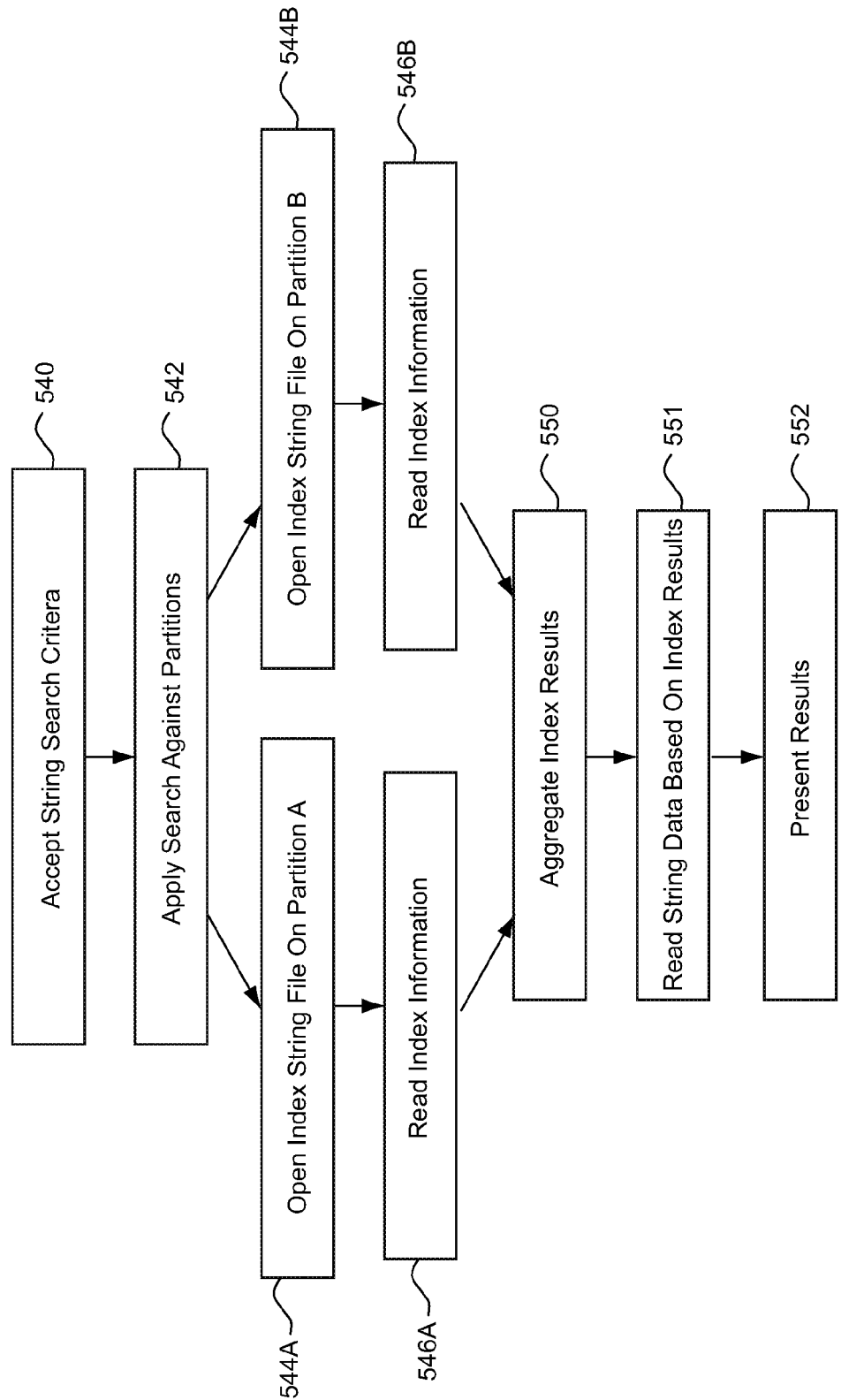
FIG. 5F is a flow chart of an example process for string searches on an exemplary database with multiple partitions.

FIG. 5F is a flow chart of an example process for string searches on an exemplary database with multiple partitions. In certain example embodiments, an interface may be provided for a user to interact with a database that uses partitions. For example, the exemplary PipesDB library described herein. When a user desires to search the database (or a data table) for a string, the user enters a string criteria and the interface to the database accepts the search criteria. For example, a user may input a search criterion to retrieve customers with the last name of "Smith." Once the search criterion is entered, the search process applies the criteria against the partitions associated with the data table in step 542. Accordingly, in each partition a search process is run over the data contents within that partition. The process may be a thread of execution, where each thread is associated with a particular core or processor of a system. While two threads (A and B) are shown in FIG. 5F, it will be appreciated that more partitions and associated threads may be added to an exemplary database system. Indeed, the methodology described herein may facilitate usage of an ever expanding number of partitions with a relatively reduced overhead cost per additional partition. In some implementations, the overhead cost of an additional partition may approach or be zero.

Accordingly, for each thread and partition, an index file is opened that relates to the search criteria (e.g., Smith.Bin) in steps 544A and 544B. In certain example embodiments, if no file with the "key" is found on the partition, the search process may immediately jump to the aggregate results step 550 (which will wait for results from the other threads). In certain example embodiments, a search may contain wildcard information. For example, the criteria may be "Smith*" where "*" represents any character. In this example, multiple index files may be opened (e.g., Smith.Bin and Smiths.Bin may both be opened and processed).

In any event, once an index file is opened, the index information is read from the file in steps 546A and 546B. In certain example embodiments, the index information may include record IDs (e.g., a unique identifier for a given table, such as GUID) that identify a row or rows where the string is located. Index information may also include location information on where the indexed word is within the stored string. For example, a record ID may be 42 and a location of the word within the stored string may be 304. In certain example embodiments, the location information corresponds to the indexed word being the 305th word in the string that is stored for record 42, where location 0 represents the first word in the string (e.g., a zero based index). Alternatively, in certain example embodiments, the location of the word may correspond to the character position of the word within the string. Thus, for a location of 304, the word (or string) may start at the 305th character within the stored string. In any event, after retrieving the string index information in steps 546A and 546B, the searches applied against the respective partitions may return.

The returned results from the respective searches against the partitions may be aggregated in step 550. Based on the aggregated indexed results, a user (or program) may then request the actual string data that corresponds to the indexed results in step 551. In certain example embodiments, this may be done by requesting a particular partition to return the string data associated with a given ID. In one example, the aggregated index results may include the above mentioned ID of 42. An exemplary database implementation may know which of the partitions storing data holds the ID 42. Thus, a request may be made specifically to known partition to retrieve the string data. The string information may then be retrieved and presented to a user in step 552. In certain example embodiments, the results may be presented in "real-time" such that the presentation of the results does not wait for each of the executing threads to finish, but instead presents and/or updates the results as each of the threads (e.g., 544A/546A vs. 544B/546B) are returned.

The above process may result in a computational complexity that is less complex than is conventionally found in string searches.

It will be appreciated that additional steps may be included in the above described process. Also, certain steps may be omitted according to certain example embodiments. For example, before returning and aggregating index results, the string data from each partition may be read and then string data returned and then aggregated. In certain example embodiments, such an implementation may increase network utilization where the partitions are located on different computers because instead of only record IDs and locations being transmitted, string information (which is generally larger) is being transmitted.

Search Operation Complexity

In certain example embodiments, the amount of time taken to search for a specific word may be constant, yet bound by the number of records that exist for that word (e.g., the number of times a word is mentioned in a given string file 360). Thus, the amount of time it takes to perform a search is related to the amount of time required to read the index file. Therefore, if an extremely large number of records exist in a particular word's index, this search may be slower than for a word with a fewer number of records. Accordingly, certain example embodiments may constrain the number of records that are read from the index file, and paginate the results. This may provide for a faster search, while at the same time allowing access to a large number of search results.

In certain example embodiments, it is possible to specify a ceiling on how many search results should be returned from a query. For example, with a ceiling of 50, a search method may open the index file and retrieve the first 50 record IDs. These may be returned as results to the user. Alternatively, or in addition, a user may specify a start position in the index file for the search. Using this method, a user may access subsets of the index, and look at small sections of the index for each retrieved subset.

This technique may prevent the user from inadvertently making a very expensive query that yields more results than are practical. Alternatively, if no ceiling is specified, all results are retrieved and returned.

By using this technique a user may observe a quicker response to time to searches that may otherwise take a longer period of time to return (e.g., by getting the results in bite-sized chunks).

This may result in a type of search that has a very fast search response (even when the result ceiling is set very high). For example, in cases where a common word is searched for (such as "THE"), the ceiling may prevent the system from spending a lot of time parsing through millions of records worth of data in the Index. Thus, a user may be able to use this feature to design an application to perform acceptably under a broad range of queries.

The following is an example of how the techniques described herein may be adapted in certain example embodiments:

UI design contains a data view that displays records in a row/column table format.

Controls are included in the UI to allow users to select NEXT or PREV.

Application keeps track of a Page number that is incremented and decremented with input from the NEXT or PREV controls respectively.

When query is made, the Search function is called with CEILING and PAGE NUMBER arguments.

When the application processes the query, the Index File is traversed to a point that is (CEILING*PAGE_NUMBER) lines down from the beginning of the file.

For example, if CEILING=50 and PAGE_NUM-BER=4, this method would seek past the first 200 results.

The search method would then get the next 50 results out of the Index File, and return them to the user.

The application may then update the displayed records with the new set, and display the corresponding page number.

SubIndexing—Multiple Word Searches

Certain example embodiments may facilitate identification of spatial adjacency relationships between multiple words. For example, if a user is searching for a word phrase, knowledge of the relative or absolute locations of the words within the phrase may be desirable. A technique for facilitating such identification includes comparing the contents of each word's index file against the contexts of other words within the search phrase. In certain example embodiments, this may include maintaining the following conditions: 1) a given RecordID for all index files; and 2) for that RecordID, position values that exist in all index files such that a position exists for each word that is one greater than the position of the previous word in the phrase. For example, the string "foo bar" may have a recordID of 1. Two index files, "foo" and "bar" may exist, both including the recordID of 1. Further, the position values for the recordID of 1 in the string file "foo" may be 0 and the values in the string file "bar" may be 1.

In processing such a search, a RecordID is first examined from the first word's Index file (e.g., "foo"). Then, if the same RecordID is found in the second word's Index file (e.g., "bar'), the process may attempt to find an adjacency between stored position values. This process may continue for the Index files of all words until either a match is not found, or a match is found and/or ruled out. At this point, the process may resume by examining the next RecordID in the first word's Index file.

If the RecordID from the first word's Index is not found in a subsequent Index file, it can be determined that the phrase does not exist for the given RecordID. A similar determination may be made if an adjacency cannot be found between any two words (e.g., succeeding positions). As such, once a phrase match is ruled out, it may not be necessary to continue the search process on the Index files of subsequent words in the phrase. In certain example embodiments, by using this type of short-circuit behavior, the number of comparisons may be relatively decreased in order to determine matches for a given phrase.

The complexity of this technique may be affected by the number of words in the search phrase (w), the number of records in a data set (n), and the average number of total positions per word index for the given search phrase (x). Accordingly, for a worst-case scenario, the number of operations for searching for a phrase can be expressed as:

$$(w*n) + (w*x)$$

$$\lim_{w \Rightarrow \infty} (w*n) + (w*x) = \infty$$

$$\lim_{n \Rightarrow \infty} (w*n) + (w*x) = \infty$$

$$\lim_{x \Rightarrow \infty} (w*n) + (w*x) = \infty$$

As any one factor approaches infinity, the complexity of the process also approaches infinity. To mitigate this behavior, certain example embodiments may decrease the number of words in a search to an upper bound. Thus, the previously unbound "w" factor may be treated as relatively constant.

Alternatively, or in addition, certain example embodiments may apply partitioning to the search for a phrase. Accordingly, the n value describe above may be decreased (or held constant) for a given partition.

Thus, certain example embodiments may set the w and n variables to respective predetermined upper bounds. Thus, $$\lim_{x \Rightarrow \infty} (1*1) + (1*x) = \infty$$

Given a random distribution of words within the strings stored in a table, the value of x may be a function of the average length of the strings that are stored in the table. In other words, if a table stores very large strings, the chances of a given word occurring in one of the strings may increase. This may, in-turn, increase the index size. Therefore, the complexity may grow in proportion to the average length of the strings being indexed.

Accordingly, certain example embodiments partition the String Index into Subindexes using a technique similar to how the data tables described herein may be partitioned. In other words, this method may create partitions of partitions where a single partition of the data table may contain many partitions for a given string column.

To create Subindexes, an upper bound r is set to limit the number of position values that a Subindex may reference. For example, if r is equal to 100, the first Subindex partition may store location references for words that occur in the first 100 words of the strings values for a column. The next Subindex partition may store location references for instances where a word's location is 100-200 in the stored string values of that column. Using this methodology, the maximum number of position values stored for a given Subindex can be limited to r*n where r is the number of possible location values, and n is the number of records in a data table partition.

In certain example embodiments, this technique may create a Subindex file that stores the RecordIDs and positions where a position of a word is between 0 and r. Further, if instances of the word can be found in a given record at a position later than r in the string, but less than 2*r, a new Subindex file is used/created that stores RecordIDs and positions for instances where the word's position is between r+1 and r*2. This process may be repeated for addition positions in an index file. By doing this, each Subindex can be searched independently and in parallel concurrence with any other Subindex.

In certain example embodiments, while the String Index can be partitioned into Subindexes, the actual string data may be left "as is." Since the Subindex files make reference to an absolute position within the full string, it may not be necessary to partition the strings themselves (e.g., access is relatively constant already).

The additional complexity of this sub indexing technique can be represented by s where s is the number of Subindex partitions. However, in certain example embodiments each Subindex search operation may be assigned to a dedicated processing core. This may decrease the cost associated with the complexity of the technique by dividing by c, where c is the number of processing cores.

By binding the maximum value of x through the partitioning of the String Index files, x may be treated as a constant. The value of r may constrain the worst case scenario for x and cause the performance of any Subindex search to be constant. This may be combined with the ability to decrease (or in some cases negate) the factor s by coupling each Subindex with a processing core. Accordingly, the complexity of the string search operation may become constant (or increase at a decreased rate) given a limited number of search terms over an arbitrary number of partitions such that each contains a constant number of records that contain strings of arbitrary length. The relationships between each entity described above can be evaluated in the following expressions where s is the number of Subindex partitions.

$$\lim_{c \Rightarrow s} s * \frac{((w*n) + (w*x))}{c} = 1$$

$$\lim_{c \Rightarrow s} s * \frac{((1*1) + (1*1))}{c} = 1$$

$$\lim_{c \Rightarrow s} s * \frac{1}{c} = 1$$

When implemented in conjunction with an example data table partition(s), this may be represented as follows where p is the number of data table partition.

$$\lim_{c \Rightarrow p*s} \frac{p*s}{c} = 1$$

It will be appreciated that the techniques described herein may multiply the number of processing cores need to perform a string search in constant time. However, it will also be appreciated that since both data table partitions and Subindex partitions remain fully independent entities, this technique may also see linear benefits from additional cores. Therefore, it is possible to more easily and predictably manage the performance of an information system of any size that is done in a conventional manner.

In certain example embodiments, program logic may be implemented to disperse a particular word to other partitions. For example, if a word "Foo" is mentioned 500 times for one partition and 5 times in another partition, program logic may "move" 250 records from the highly populated partition to the lower populated partition. This process may be an automatic process (e.g., that is triggered if searching for a word is particularly slow) or may be a user driven process (e.g., an administrator or other user decides how the words should be divided up between the partitions. As this process may be a relatively expensive operation, it may be performed infrequently.

Search and Index Memory Usage

Certain example embodiments provide index and search methods with a low-overhead memory usage model due to the fact that only the necessary components of the indexing system are stored in memory at any point in time. Since strings in records can produce a very high volume of data, the combined size of the indexes for each word can become very large. For this reason, it may become impractical to store the entire index in system memory (e.g., if a given system does not have enough memory). In certain example embodiments, only the searched word index data is loaded. Thus, the overall memory usage is low. Alternatively, or in addition, it may be possible to implement a method to analyze data from an index file one record line at a time if memory resources are very low.

System Memory Usage Model

Using traditional methods and algorithms for indexing and searching data, there is a general requirement to store all records from a data table in system memory at the same time. This may implicitly provide an upper bound on the amount of data that can be stored in a data table before system memory is completely exhausted.

Although system memory can be added to a system to extend a lifecycle of the system, the ever-finite quantity of system memory may limit the applicability of certain data structures for use with very large quantities of data.

Further, there may be certain cases where system memory resources are limited in ways that would make traditional database technology impractical to implement. One such case would be a small organization with little money to devote to a well equipped server. Another case would be applications where the technology involved precludes the use of a large server, such as in mobile devices, or over P2P networks. A third case would be an application that would benefit from a well equipped dedicated server, but does not warrant the expenses when considering the benefits provided by the application.

When considering the cases above, in each case, it may be advantageous to mitigate the constraints of low system memory and resources.

Accordingly, certain example embodiments provide a database library that may provide developers with a rich set of memory management options that balance overall system performance with memory thrift.

Below is a brief description of the system memory usage pattern implemented in an exemplary PipesDB Library according to certain example embodiments:

Partitions Include the Following:
  Integral Column Data Files
    Include an array of data of the column's integral type.
  Integral Column Index Files
    Include an array of integers that represents the column's ascending order.
  String Column Data Files
    Include:
      A table of integers that represents where a particular row's string can be found in the file, and how long the string is.
      The string value of every row in the column.
  String Column Index Files
    One file exists for each unique word that is used in the String Column for the entire Partition.
    Each file contains a list of the rows that contain the word, and the positions within the row's string where the word can be found.

When a partition is created or loaded into system memory, the contents of the Integral Column Data Files and Integral Column Index Files are loaded into memory by default. This data may be relatively small, and in most cases, even a modest server can store a very large number of records without having a major impact on memory usage.

The below example provides exemplary data used by integral columns in a partition from a typical data table:
  The partition contains 65,536 records.
  The data table contains 10 integral value columns with an average of 6 bytes per value (some Int32 typed columns, and some Int64 typed columns).
  Combined with the Integral Column Index value, this is an average of 10 bytes used per Column, or 100 bytes used per row in the Partition.

For the entire partition, this would be 6,553,600 bytes, or 6.25 MB.

Using this, a database with 10,000,000 records, or a little over 150 Partitions, would require approximately 1 GB of system memory.

Accordingly, in certain example embodiments, since integral value columns have a relatively small impact on memory usage, the database keeps them in memory at all times.

However, the amount of system memory consumed by string columns can be higher than those of an integral value column, for example:

A partition contains 65,536 records with 2 string columns.

Each string column contains approximately 250 characters per string (possibly storing the body data of emails or comments provided by users.

Assuming 1 byte character encoding each partition would use 500*65536 or 31.25 MB per partition.

For multi-language support, Using 16-bit Unicode, or 32-bit encoding would bring that number to 62.5 or 125 MB per Partition.

With these numbers, the string columns in such a system would use anywhere between 4.75 and 18.5 GB of system memory, depending upon the string encoding.

Furthermore, when users manually enter string data, it may become possible for the size of data to exceed the values predicted at design-time. Alternatively, a developer may impose limits on how long user-entered strings can be. Both of these issues may pose inherent problems to a system (e.g., the system becoming unreliable if the memory required for string data is not planned for and/or design-imposed limitations on string size can be frustrating for users).

Accordingly, certain example embodiments analyze database usage patterns to find frequently used string data. For example, in some cases, it can be found that only recently created data is accessed frequently. Additionally, when looking at data access patterns, if a record is accessed once, it is statistically more likely for that record to be accessed again over another record. Considering these observations, it could be argued that keeping infrequently used strings from older records in system memory is wasteful of server resources. Nonetheless, it is hard to qualitatively determine which records fit in the "infrequently used" category.

Accordingly, in certain example embodiments (e.g., the library mentioned above), it may be advantageous to design a system for a target server with known hardware constraints where the developer could declare a finite amount of system memory that should be allocated for a partition in the data table. Further, scalability could be managed in an orderly manner if a system could be designed to dynamically change the amount of memory allocated to a partition in order to establish a priority order between partitions in the data table, as well as allowing for unexpected system growth without causing undue system underperformance or failure.

Certain example embodiments include dynamic memory usage management with information on string data usage. Certain exemplary embodiments include a cache system to address the above issues. In certain example embodiments, there is a one-to-one correspondence between a data column (e.g., Column 320) and an instance of a string cache. Furthermore, as shown in FIG. 4A, each partition may include multiple data columns. As described herein the columns may include string data or other data (e.g., integer data). Also, each data table may include multiple partitions. The following describes an exemplary cache system that works at the partition-level.

Upon the creation of a partition, a Maximum Size value is provided to determine how much system memory should be made available to store string data in the string cache. The string cache loads the string data from the most recent records in the partition into the cache queue. Each time a record's string data is loaded into the cache queue, a size variable that store's the string cache's size is updated to add the size of the loaded string data. Once the size value meets the Maximum Size value, the string cache stops loading data into the cache queue.

When a user attempts to retrieve a string value for a particular row from the partition, the string cache performs the following operations. Check the cache to see if the record exists in the cache queue. If the record exists in the cache, it is retrieved from system memory and returned to the user. The cache queue is then rearranged to put the value that was just accessed to the back of the queue. If the record does not exist in the cache, it is retrieved from disk and placed into the cache queue. If Maximum Size has already been reached, strings are dequeued until the cache queue has room for the new string. The cache size is updated according to the addition and removal of strings. The string is returned to the user.

Using this system, the number of disk accesses may be decreased. If the string cache is large enough, in fact, the disk may never be accessed after the initial loading of the strings. In the case that the string cache is smaller to reduce memory usage, only the most recently used records exist in the cache. Using this model, in most cases, the vast majority of data table access is to data that is already in memory. In this respect, this system is almost always as efficient as a system that keeps all string data in memory.

The string cache system as described above may allow for predictable memory usage during the design of a system.

However, it may be difficult to determine how many partitions will eventually be used over the lifecycle of a system. For this reason, the string cache implements a feature that allows the partition to specify a new Maximum Size at runtime. When a new Maximum Size is specified, the string cache dequeues items until the cached data fits within the Maximum Size value. In certain example embodiments, control over the string cache size may be controlled at the data table, partition, and/or column level.

In certain example embodiments, there can be a highly variable number of string cache instances. For example, the addition of more partitions may become an operative multiplier on how much memory is consumed by instances of the string cache.

When a partition is created, a certain amount of memory may be allocated for each string cache that is associated with each string column. However, if more partitions are created, it may become necessary or beneficial to reduce the original memory footprint by scaling down the memory used by each partition.

Thus, in certain example embodiments, the size of the string cache may be "controlled" at varying levels of abstraction. For example, the size of the string cache set in relation to a given data column, a given partition, and/or a data table.

This makes it possible to create a global memory management scheme where the data table may issue "instructions" to its child entities. Thus, a data table may ask each of its partitions for how much memory they are using. Correspondingly, each partition asks each data column how much memory they are using. And finally the data column requests the same of their respective string caches. All results may be combined back for the data table.

Thus, much in the same way, if a user wants to reduce memory consumption by 100 MB from a global level (e.g., a data table), the number of partitions may be divided by 100, and each partition "releases" that amount of memory from usage. This request is pushed down the chain, and the string caches resize themselves accordingly. Note, that in certain example embodiments there may be minimum thresholds such that it may not be possible to make the requested memory footprint reduction.

It will be appreciated that other example embodiments may use different structures to control and/or manage memory usage.

With this implementation, it may be possible to design an overall information system that contains failsafe measures to prevent major redesign in the case that memory is exhausted. Additionally, it provides a larger window of time in which a system can function normally prior to a server upgrade. In most cases, the system would still be very usable until the number of partitions vastly exceeds the number of partitions planned at design-time. Further, this method of decreasing memory-per-Partition allows for an elegant way to handle OutOfMemoryExceptions that may occur.

In all, the dynamic memory management and string caching model provides an efficient and reliable way of handling unpredictable string data without undue sacrifice to system features and performance. Further, such an implementation adds to the reliability of the entire system and makes for a more robust server over the lifecycle of an application. Lastly, with predictable responses to system growth, this system provides organizations with a large window of time to make well-planned decisions on the upgrade of server and network resources without significant impact to users of the system.

The above mentioned exemplary PipesDB implements some (or all) of the functionality normally associated with a relational database, including indexing and search methods. Further, this exemplary implementation includes efficient methods for partitioning data tables into independent units that allow for a decreased memory footprint for general usage, at the same time allowing parallel concurrent search methods that make the system very scalable. Additionally, string data, which generally uses more memory than other data, is accessed in a method that caches recently used data in a memory-restricted structure that avoids runaway memory usage, yet still provides good performance.

Figure 6:
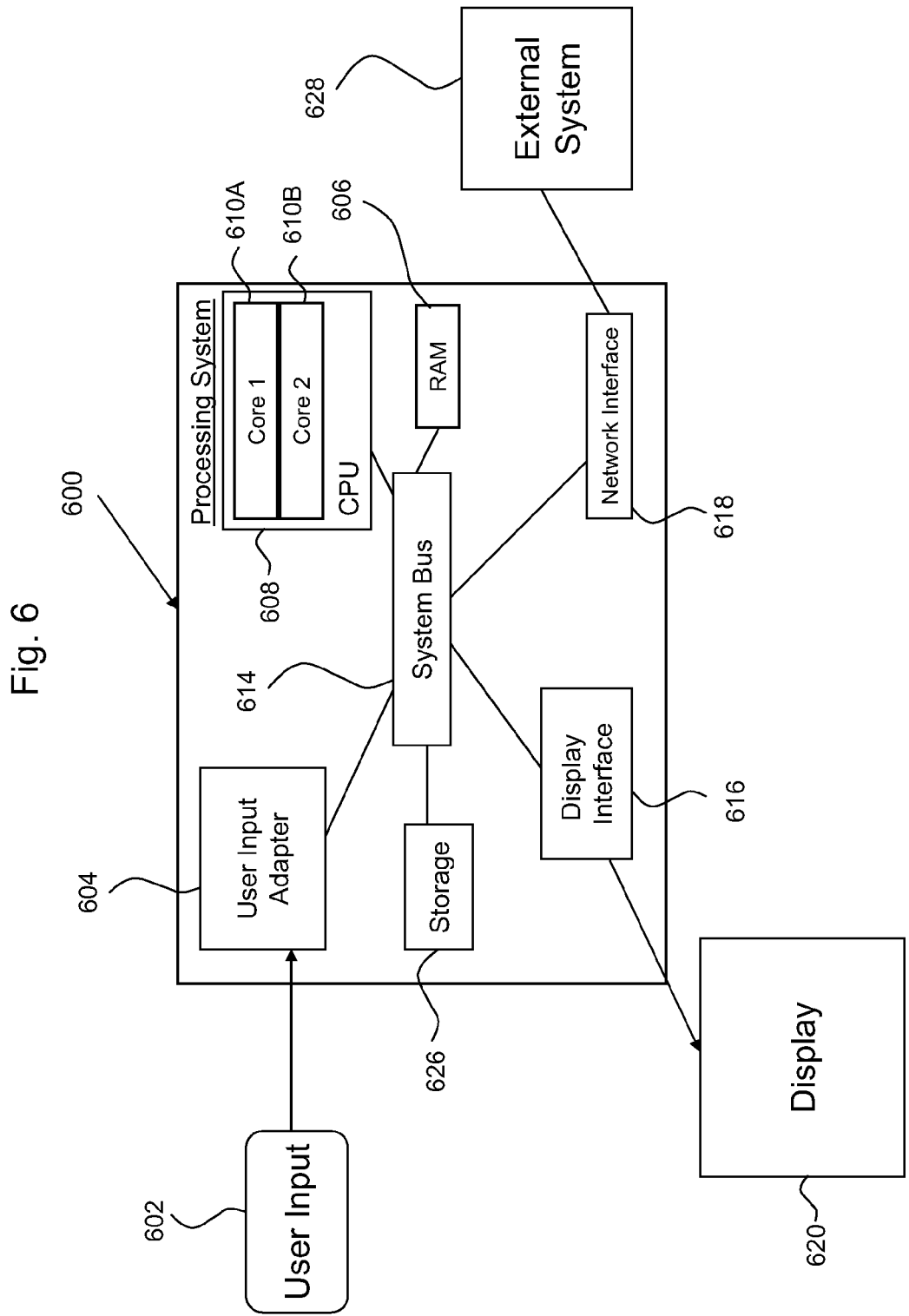
FIG. 6 is an example processing system configured to implement an example database management system and associated database according to certain example embodiments.

FIG. 6 is an example processing system configured to implement an example database management system and associated database according to certain example embodiments. Processing system 600 may include CPU 608 that may have cores 1 and 2, 610A and 610B respectively. CPU may communicate with RAM 606, storage medium 626 of a system bus 614. Processing system 600 may facilitate user input through a user input adapter 604 and user input 602. For example, user input may be provided through a keyboard, mouse, touch screen, or the like. Processing system may also provide an out display through display interface 616 to display 620 (e.g., an LCD or other similar display device). As noted above, multiple processing systems may be used according to certain example embodiments. Accordingly, processing system 600 may also include a network interface 618, such as, for example, an Ethernet card or the like. This may facilitate communication between the processing system 600 and an external system 628. External system 628 may be another processing system (e.g., similar to processing system 628) that stores and processes a partition of a data table and its associated index.

In certain example embodiments, the partitioned index for use with a database may be embodied within a general purpose computing device. For example, the computing device may be a desktop computer, a laptop computer, a handheld computer, or another type of computing device, or the like. The system may include a memory, a processor, a display and other elements as needed.

The processor may include at least one conventional processor or microprocessor that executes instructions. The processor may be a general purpose processor or a special purpose integrated circuit, such as an ASIC, and may include more than one processor section. Additionally, the system may include a plurality of processors.

The memory may be a random access memory (RAM) or another type of dynamic storage device that stores information and instructions for execution by the processor. The memory may also include a read-only memory (ROM) which may include a conventional ROM device or another type of non-volatile storage device that stores information and instructions for the processor. The memory may be any memory device (e.g., semiconductor memory) that stores data for use by the system, and may comprise a non-transitory computer readable medium having encoded therein instructions for revealing hidden information in an electronic document.

The system may perform functions in response to the processor by executing sequences of instructions or instruction sets contained in a computer-readable medium, such as, for example, the memory. Such instructions may be read into the memory from another a storage device, or from a separate device via a communication interface, or may be downloaded from an external source such as the Internet. The system may be a stand-alone system, such as a personal computer, or may be connected to a network such as an intranet, the Internet, or the like.

The memory may store instructions that may be executed by the processor to perform various functions. For example, the memory may store instructions to allow the system to perform various functions in association with a particular application, such as the functionality of the partitioned index of the present technology.

The following describes an exemplary PipesDB library that implements certain techniques described herein. Public functions are shown (e.g., functions that a user of the library can use). Further, all the functions within the library are shown (e.g., including those functions that are "private" and only directly used by the library).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

I claim:

1. A computer implemented method for managing a database that is configured for use with a processing system, the processing system performing the method comprising:

maintaining a structured organization of data over a plurality of partitions within the database, each one of the plurality of partitions having a size limit;

inserting new data into the structured organization of data;

automatically adding a new partition when the inserted new data results in a size of the one of the plurality of partitions meeting or exceeding the respective size limit;

assigning each one of the new partitions to respective processing resources of the processing system, where at least some of the partitions in the plurality of partitions are assigned to different processing resources; and indexing the data within each one of the plurality of partitions, wherein the data of the structured organization is string data, the structured organization further including, for each partition,
- a string dataset including (a) a plurality of strings and (b) a table that includes (1) a plurality of first values, each of which indicate where a corresponding one of the plurality strings is located within the string dataset and (2) a plurality of second values, each of which indicate a length of the corresponding one of the plurality strings, and
- a plurality of index datasets, each one of the plurality of index datasets related to a word from the plurality of strings in the string dataset, each one of the plurality of index datasets storing (a) a record value that indicates a corresponding record in the table and (b) a position value that indicates where the word is located within the plurality strings, wherein the string dataset is a string file and the plurality of index datasets is a plurality of index files that each have a corresponding file name, where record value(s) and position value(s) for each one of the plurality index files are based on the file name of the corresponding file.

2. The method of claim 1, wherein the processing system includes a number of processors or cores of processors that is at least equal to a number of the plurality of partitions, each one of the plurality of partitions associated with a respective core or processor of the processing system.

3. The method of claim 1, wherein the automatically added new partition is associated with a new processor or core.

4. The method of claim 1, further comprising executing a search criteria against the structured organization of data, wherein the executed search includes executing at least one search task against each of the partitions, in parallel with each other, based on the search criteria.

5. The method of claim 4, further comprising aggregating the results of each one of the executed search tasks.

6. The method of claim 1, the string dataset is a string file and the plurality of index datasets is a plurality of index files.

7. The method of claim 6, further comprising:
executing a string search criteria against the structured organization of string data, wherein the executed search includes executing at least one string search task against each of the partitions, in parallel, based on the string search criteria, the at least one string search task including: 1) locating at least one of the plurality of index files relating to the search criteria; and 2) reading index information from the located index file.

8. The method of claim 7, further comprising aggregating the index information from each one of the executed string search tasks.

9. The method of claim 7, further comprising retrieving a word from the string file based on the read index information, the index information including a recordID and a position reference to the word within the string.

10. The method of claim 7, further comprising maintaining an open file stream to the string file over multiple accesses to the string file.

11. The method of claim 7, dividing each one of the plurality of index files into multiple subindex files when a number of index information for the associated word in the index file is greater than a predetermined amount, each one of the multiple subindexes storing a subset of the index information.

12. The method of claim 1, wherein at least a subset of the data in the structured organization is stored in a cache that has a determined size.

13. The method of claim 12, wherein a size of the cache is configurable by a user.

14. The method of claim 12, further comprising adding new cache data to the cache when the new cache data does not already exist in the cache.

15. The method of claim 14, further comprising dequeing already cached data from the cache before the new cache data is added to the queue when the size of the cache meets or exceeds a determined size.

16. The method of claim 15, wherein the determined size is based on exceeding an amount of memory associated with processing system that is allocated to the cache.

17. A database-management system for managing a database, the database-management system comprising:
a processing system that includes plural different processing resources, the processing system configured to:
maintain a structured organization of data over a plurality of partitions within the database, each one of the plurality of partitions having a size limit and being assigned to at least one of the plural different processing resources;
insert new data into the structured organization of data;
automatically add a new partition when the inserted new data results in a size of the one of the plurality of partitions meeting or exceeding the respective size limit;
assign the new partition to at least one of the plural different processing resources; and
maintain an index on each of the partitions for the data located on the associated partition,
wherein the data of the structured organization is string data, the structured organization further including,
for each partition,
a string dataset that includes (a) a plurality of strings and (b) a table that includes (1) a plurality of first values, each of which indicate where a corresponding one of the plurality strings is within the string dataset and (2) a plurality of second values, each of which indicate a length of the corresponding one of the plurality strings, and
wherein the index includes a plurality of index datasets, each one of the plurality of index datasets relating to a word in the plurality of strings, each one of the plurality of index datasets storing plural records that each comprise (a) a record index that indicates one of the plurality of first values in the table for the corresponding one of the plurality of strings and (b) a position index that indicates where the related word is located within the corresponding one of the plurality strings,
wherein the string dataset is a string file and the plurality of index datasets is a plurality of index files that each have a corresponding file name, where the record and position index data of each file is based on the name of the corresponding file.

18. The system of claim 17, wherein the processing system is further configured to execute a string search criteria against the structured organization of string data, wherein the string search criteria includes at least one string search task configured to execute in association with each of the partitions, in parallel, based on the string search criteria, each string search task further configured to:

locate at least one of the plurality of index files based on the related word of the at least one of the plurality of index files and the search criteria;

read from the located at least one of the plurality of index files at least one record index and at least one position index; and retrieve at least one string from the string file based on the identified at least one record index and identified at least one position index.

19. A non-transitory computer readable storage medium storing computer-readable instructions for performing a string search against a database system storing string data over a plurality of partitions, each one of the partitions including: 1) a string file that includes (a) at least some of the string data, and (b) a table that includes a plurality of first values, each of which indicate where a corresponding one string of the string data is within the string file and a plurality of second values, each of which indicate a length of the corresponding one string, and 2) a plurality of index files that are each associated with a word or words within the string file of a corresponding partition, each one of the plurality of index files storing at least one record that comprises a reference indicator that indicates one of the plurality first values, and a position index that indicates where the related word is located within the corresponding one string, the database system including at least one processor, the stored instructions comprising instructions configured to:

execute a search, in parallel, over the multiple partitions, that is related to at least one word within the string data;

locate, on at least one of the multiple partitions, at least one of the plurality of index files related to the at least one word;

read at least one reference indicator and at least one corresponding position index from the located at least one of the plurality of index files; and retrieve, on the at least one of the multiple partitions, at least one string and/or word from the string file based on the read reference indicator and the at least one corresponding position index, wherein at least some of the multiple partitions are assigned to different processing resources of the database system where the executed search over the multiple partitions and the retrieval of the at least one string and/or word are accomplished using the assigned processing resources of the respective partition, wherein the plurality of index files each have a corresponding file name where the at least one record of a corresponding one of the plurality of index files includes reference indicator(s) and position index(es) for an indexed word that is based on the corresponding file name.

* * * * *